US011954564B2

(12) United States Patent
Adams et al.

(10) Patent No.: US 11,954,564 B2
(45) Date of Patent: *Apr. 9, 2024

(54) IMPLEMENTING DYNAMICALLY AND AUTOMATICALLY ALTERING USER PROFILE FOR ENHANCED PERFORMANCE (71) Applicant: International Business Machines Corporation, Armonk, NY (US)

(72) Inventors: Thomas N. Adams, Round Rock, TX (US); Sarah W. Huber, Ames, IA (US); Meghna Paruthi, Austin, TX (US); Maria R. Ward, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1575 days.

This patent is subject to a terminal disclaimer.

(21) Appl. No.: 15/711,809

(22) Filed: Sep. 21, 2017

(65) Prior Publication Data

US 2019/0087748 A1 Mar. 21, 2019

(51) Int. Cl.
*G06N 20/00* (2019.01)
*G06F 9/445* (2018.01)
(Continued)

(52) U.S. Cl.
CPC .......... *G06N 20/00* (2019.01); *G06F 9/4451* (2013.01); *G06F 16/337* (2019.01);
(Continued)

(58) Field of Classification Search
CPC ... G06N 20/00; G06F 16/337; G06F 16/9535; G06F 9/4451; H04L 67/306; G06Q 50/01; G06Q 30/0224
See application file for complete search history.

(56) References Cited

U.S. PATENT DOCUMENTS 5,945,988 A  8/1999 Williams et al.
6,662,177 B1 12/2003 Martino et al.
(Continued)

FOREIGN PATENT DOCUMENTS

CN  102521754 A  6/2012
CN  102822882 A  12/2012
(Continued)

OTHER PUBLICATIONS

Coccoli et al., "Cognitive Computing in Education," in 12.2 J. E-learning and Knowledge Soc'y 55-69 (2016). (Year: 2016).*
(Continued)

*Primary Examiner* — Ryan C Vaughn
(74) *Attorney, Agent, or Firm* — Grant Johnson (57) ABSTRACT A computer-implemented method, and a computer system are provided for implementing dynamic and automatic altering a user profile based on machine learning and cognitive analysis to improve user performance. The user profile is dynamically altered based upon live data from multiple external data sources using machine learning and cognitive application programming interfaces (APIs) without explicit input from the user. The altered user profile is automatically stored for the user. The stored user profile is deployed for multiple selected user applications enabling enhanced performance for the user.

11 Claims, 6 Drawing Sheets (51) Int. Cl.
*G06F 16/335* (2019.01)
*G06F 16/9535* (2019.01)
*H04L 67/306* (2022.01)
*G06Q 30/0207* (2023.01)
*G06Q 50/00* (2012.01)

(52) U.S. Cl.
CPC ........ *G06F 16/9535* (2019.01); *H04L 67/306* (2013.01); *G06Q 30/0224* (2013.01); *G06Q 50/01* (2013.01)

(56) References Cited

U.S. PATENT DOCUMENTS

| | | | |
|---|---|---|---|
| 6,698,020 | B1 | 2/2004 | Zigmond et al. |
| 7,020,893 | B2 | 3/2006 | Connelly |
| 7,146,416 | B1 | 12/2006 | Yoo |
| 7,650,342 | B2 | 1/2010 | Sugiyama |
| 7,885,902 | B1 | 2/2011 | Shoemaker |
| 10,261,759 | B2 | 4/2019 | Ng |
| 11,061,973 | B2 | 7/2021 | Ziklik |
| 2012/0096435 | A1 | 4/2012 | Manolescu |
| 2014/0156721 | A1 | 6/2014 | Kihara |
| 2016/0015309 | A1 | 1/2016 | Mills |
| 2016/0255082 | A1 | 9/2016 | Rathod |
| 2016/0335556 | A1 | 11/2016 | Teraoka |
| 2016/0379253 | A1* | 12/2016 | Chan ............... H04L 67/20 705/14.53 |
| 2017/0093722 | A1* | 3/2017 | González Castaño .. H04L 67/22 |
| 2017/0103180 | A1* | 4/2017 | Jiao ............... G16H 20/10 |
| 2017/0109390 | A1* | 4/2017 | Bradley ............... G06F 16/335 |

FOREIGN PATENT DOCUMENTS

| | | | |
|---|---|---|---|
| CN | 105190597 | A | 12/2015 |
| CN | 105308587 | A | 2/2016 |
| JP | 2014112321 | A | 6/2014 |
| JP | 2016212793 | A | 12/2016 |
| JP | 2023052534 | A | 4/2023 |
| WO | 2005122013 | A1 | 12/2005 |
| WO | WO-2017205683 | A1 * | 11/2017 ............. G06F 16/27 |
| WO | 2019058265 | A1 | 3/2019 |

OTHER PUBLICATIONS

Olmstead et al., Apps Permissions in the Google Play Store, http://www.pewinternet.org/2015/11/10/apps-permissions-in-the-google-play-store/ (Nov. 10, 2015). (Year: 2015).*

Appendix P List of Patents and Patent Applications Treated as Related Jan. 24, 2018.

Brusilovsky "From adaptive hypermedia to the adaptive web." Communications of the ACM 45.5 (2002): 30-33.

Burns et al. "Mining usage data for adaptive personalisation of smartphone based help-on-demand services." Proceedings of the 6th International Conference on PErvasive Technologies Related to Assistive Environments. ACM, 2013.

Yu et al., "Building user profile based on concept and relation for web personalized services." International Conference on Innovation and Information Management. 2012.

Zayani et al. "An adaptation approach: query enrichment by user profile." Advanced Internet Based Systems and Applications. Springer Berlin Heidelberg, 2009. 351-361.

International Search Report and Written Opinion of the International Searching Authority or the Declaration, PCT/AB2018/057199, Filed Sep. 19, 2018, dated Jan. 21, 2019.

Japanese Patent Application No. 2020-513282, Notice of Reasons for Refusal—Translated, dated Dec. 28, 2021.

Watson is not merely a question answering system and the entire appearance and final goal, NIKKEI Robotics, Nikkei's BP, Jan. 10, 2015, pp. 2, pp. 12-13.

Chumki Basu, Haym Hirsh, and William Cohen. 1998. Recommendation as classification: using social and content-based information in recommendation. In Proceedings of the fifteenth national/tenth conference on Artificial intelligence/Innovative applications of artificial intelligence (AAAI '98/IAAI '98). American Association for Artificial Intelligence, USA, 714-720. www.aaai.org/Papers/AAAI/1998/AAAI98-101.pdf.

Eric Bloedorn, Inderjeet Mani, and T. Richard MacMillan. 1996. Machine learning of user profiles: representational issues. In Proceedings of the thirteenth national conference on Artificial intelligence—vol. 1 (AAAI'96). AAAI Press, 433-438. www.mli.gmu.edu/papers/96-2000/aaai96.pdf.

User Profile Machine Learning, https://eagle.incubator.apache.org/docs/user-profile-ml.html. Retrieved from the internet on Dec. 30, 2021.

Decision of Refusal dated from Sep. 9, 2022 from Japanese Patent Application No. 2020-513282 filed Sep. 19, 2018.

Decision to Grant a Patent, received Jan. 9, 2024, Japanese Patent Application No. JP2023-006987, filed on Sep. 19, 2018, 2 pages.

* cited by examiner

IMPLEMENTING DYNAMICALLY AND AUTOMATICALLY ALTERING USER PROFILE FOR ENHANCED PERFORMANCE

FIELD OF THE INVENTION

The present invention relates generally to the data processing field, and more particularly, relates to a method and computer system for implementing dynamically and automatically altering a user profile based on machine learning and cognitive analysis.

DESCRIPTION OF THE RELATED ART

User profiles typically include an explicit digital representation of an identity of a user, enabling a visual display of data associated with a specific user.

User profiles often are static and do not change unless manually changed by a user. This can lead to stale and inaccurate information which becomes less useful and relevant over time as compared to the initial intent for the user profile.

A need exists for an effective mechanism to improve user performance by dynamically and automatically altering a user profile based on machine learning and cognitive analysis.

SUMMARY OF THE INVENTION

Principal aspects of the present invention are to provide a method and computer system for implementing dynamically and automatically altering a user profile based on machine learning and cognitive analysis to improve user performance. Other important aspects of the present invention are to provide such method, and system substantially without negative effects and that overcome some of the disadvantages of prior art arrangements.

In brief, a computer-implemented method and a computer system are provided for implementing dynamically and automatically altering of a user profile based on machine learning and cognitive analysis to improve user performance. The user profile is dynamically altered based upon live data from multiple external data sources using machine learning and cognitive application programming interfaces (APIs) without explicit input from the user. The altered user profile for the user is automatically stored. The stored user profile is deployed for multiple selected user applications enabling enhanced performance for the user.

In accordance with features of the invention, the live data include monitored system and network user metrics, such as social media, online purchase history, and applications.

In accordance with features of the invention, learned usage patterns are used for altering the user profile.

In accordance with features of the invention, the user allows access to predefined external data sources, the external data sources granted access permissions are dynamically monitored without any further manual input from the user.

In accordance with features of the invention, historical trend analysis of monitored real time data is applied for altering the user profile.

In accordance with features of the invention, the ability is provided to effectively predict user preferences by data analysis via a cognitive process from allowed data sources.

In accordance with features of the invention, the live data include monitored applications, such as E-mail and a user calendar.

In accordance with features of the invention, user profile updates are automatically selected based on identified user interests and preferences enabling optimal performance.

In accordance with features of the invention, monitored real time data are analyzed, for example, via Watson and other selected cognitive APIs, such as Alchemy Language, Concept Insights, Dialog, and Visual Insights.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify a location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In accordance with features of the invention, a method and a system are provided for implementing dynamic and automatic altering of a user profile based on machine learning and cognitive analysis to improve user performance. The user profile is dynamically altered based upon live data from multiple external data sources using machine learning and cognitive application programming interfaces (APIs) without explicit input from the user. The altered user profile for the user is automatically stored. The stored user profile is deployed for multiple selected user applications enabling enhanced performance for the user.

Figure 1:
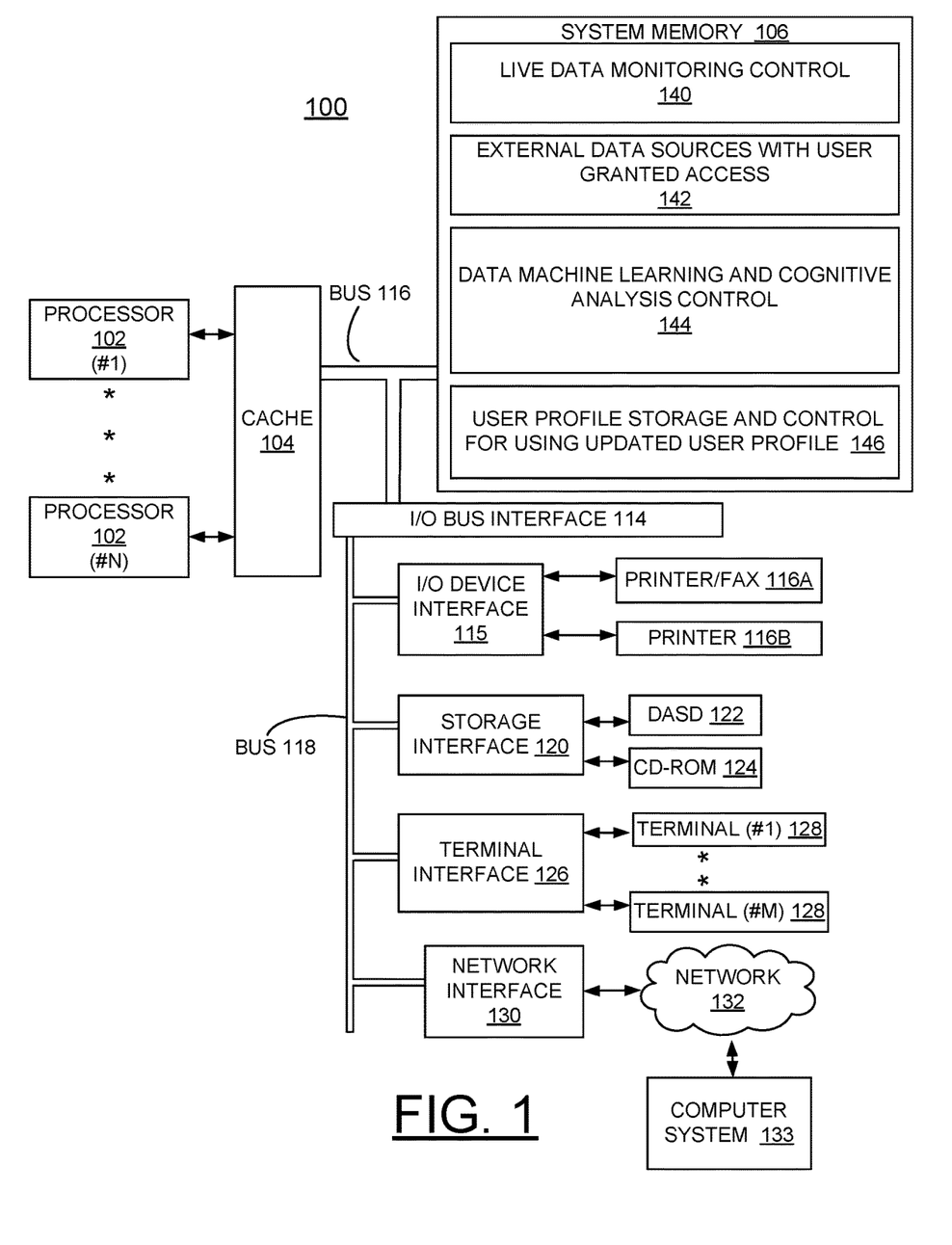
FIG. 1 illustrates an example computer system for implementing dynamically and automatically altering a user profile based on machine learning and cognitive analysis in accordance with an embodiment of the invention.

Having reference now to the drawings, in FIG. 1, there is shown an example computer system generally designated by the reference character 100 for implementing dynamically and automatically altering a user profile based on machine learning and cognitive analysis in accordance with preferred embodiments. Computer system 100 represents, for example, an example cloud computing node. Computer system 100 is only one example of a suitable cloud computing node and is not intended to suggest any limitation as to the scope of use or functionality of embodiments of the present invention described herein. Computer system 100 is operational with numerous other general purpose or special purpose computing system environments or configurations. Examples of well-known computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 100 may include one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a memory system 106 connected to bus 116. Memory system 106 includes a random-access semiconductor memory for storing data, including programs. Memory system 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes an I/O device interface 115 coupled to I/O devices, such as a first printer/fax 116A, and a second printer 116B, a storage interface 120 coupled to storage devices, such as a direct access storage device (DASD) 122 and a CD-ROM 124. Computer system 100 includes a terminal interface 126 coupled to a plurality of terminals 128, #1-M, and a network interface 130 coupled to a network 132, such as the Internet, local area or other networks. Network 132 is coupled to one or more computer systems 133.

I/O bus interface 114 communicates with multiple I/O interface units 114, 120, 126, and 130, which are also known as I/O processors (IOPs) or I/O adapters (IOAs), through system I/O bus 116. System I/O bus 116 is, for example, an industry standard PCI bus, or other appropriate bus technology.

Memory system 106 includes a live data monitoring control 140 in accordance with preferred embodiments. Memory system 106 stores external data sources with user granted access 142, data machine learning and cognitive analysis control 144 and user profile storage and control for using updated user profile 146 in accordance with preferred embodiments. Memory system 106 includes the user profile storage and control for using updated user profile 146, for example, to store and deploy the updated user profile for multiple selected user applications enabling enhanced performance for the user in accordance with preferred embodiments.

In accordance with features of the invention, dynamic and automatic altering a user profile based on machine learning and cognitive analysis for optimal performance is provided based upon live data monitoring 140 of system and user metrics, such as social media, purchase history, and applications for the user. A user profile is dynamically updated in real time via data captured and analyzed from multiple external data sources.

In accordance with features of the invention, the ability is provided to effectively predict user preferences by data analysis via cognitive processes from allowed data sources. User profile updates are automatically selected using machine learning and cognitive application programming interfaces (APIs) without explicit input from the user. User profile updates are automatically selected based on identified user interests and preferences, enabling optimal performance.

Computer system 100 is shown in simplified form sufficient for understanding the present invention. The illustrated example computer system 100 is not intended to imply architectural or functional limitations. The present invention can be used with various hardware implementations and systems, such as cloud systems and various internal hardware devices.

Figure 2:
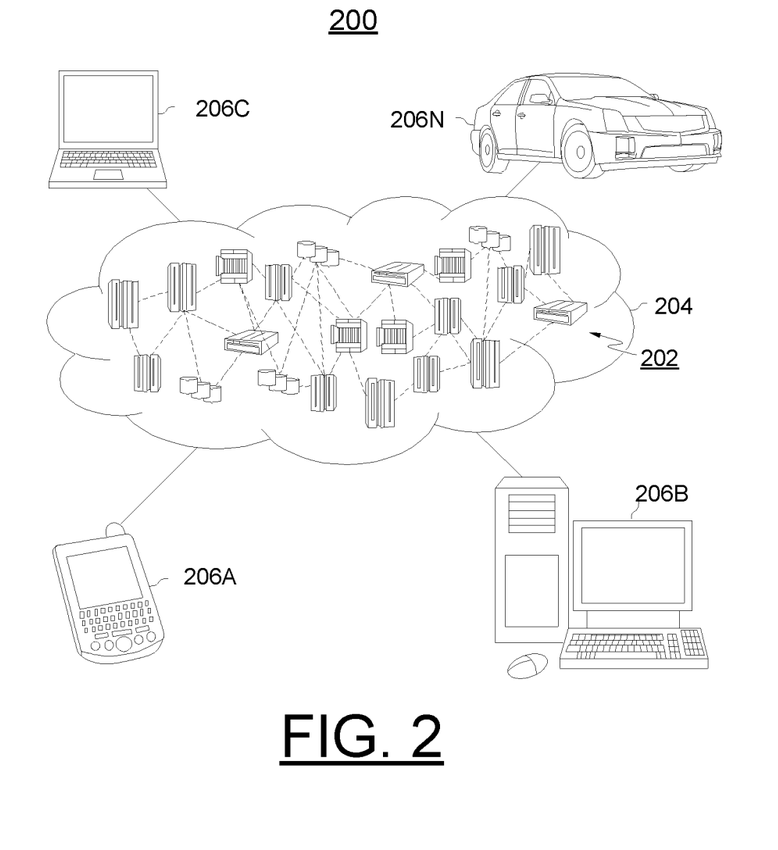
FIG. 2 illustrates a cloud computing environment according to an embodiment of the present invention.

Referring to FIG. 2, illustrative cloud system 200 is depicted. As shown, one or more cloud computing nodes 202 are included in a cloud computing environment 204 with which local computing devices used by cloud consumers, such as personal digital assistant (PDA) or cellular telephone 206A, desktop computer 206B, laptop computer 206C, and/or automobile computer system 206N may communicate. Nodes 202 may communicate with one another. They may be grouped (not shown) physically or virtually, in one or more networks, such as Private, Community, Public, or Hybrid clouds as described hereinabove, or a combination thereof. This allows cloud computing environment 202 to offer infrastructure, platforms and/or software as services for which a cloud consumer does not need to maintain resources on a local computing device. It is understood that the types of computing devices 206A-N shown in FIG. 2 are intended to be illustrative only and that computing nodes 202 and cloud computing environment 204 can communicate with any type of computerized device over any type of network and/or network addressable connection (e.g., using a web browser).

Figure 3:
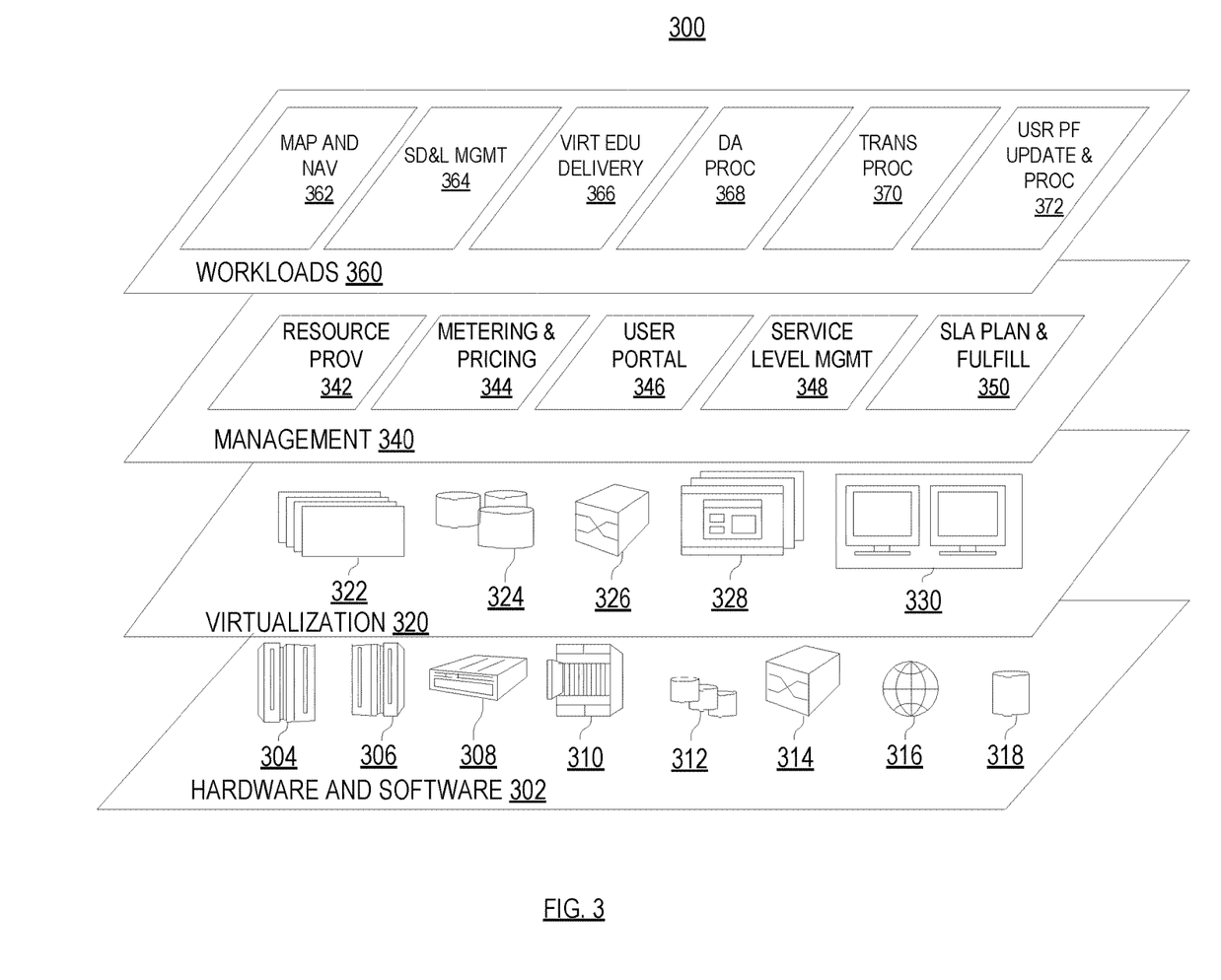
FIG. 3 illustrates abstraction model layers according to an embodiment of the present invention.

Referring now to FIG. 3, a set 300 of functional abstraction layers provided by cloud computing environment 202 of FIG. 2 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include: mainframes 304; RISC (Reduced Instruction Set Computer) architecture based servers 306; servers 308; blade servers 310; storage devices 312; and networks and networking components 314. In some embodiments, software components include network application server software 316 and database software 318.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and dynamic and automatic user profile updating and processing 372 of the preferred embodiments.

In accordance with features of the invention, the user profile is dynamically altered based upon live data from multiple external data sources using machine learning and cognitive application programming interfaces (APIs) without explicit input from the user. The altered user profile for the user is automatically stored. The stored user profile is deployed for multiple selected user applications enabling enhanced performance for the user.

In accordance with features of the invention, the user allows access to predefined external data sources, the external data sources granted access permissions are dynamically monitored without any further manual input from the user.

In accordance with features of the invention, the live data include monitored system and network user metrics, such as social media, online purchase history, and applications. Historical trend analysis of monitored real time data are applied for altering the user profile.

In accordance with features of the invention, the ability is provided to effectively predict user preferences by data analysis via cognitive processes from allowed data sources and used for altering the user profile.

Figure 4:
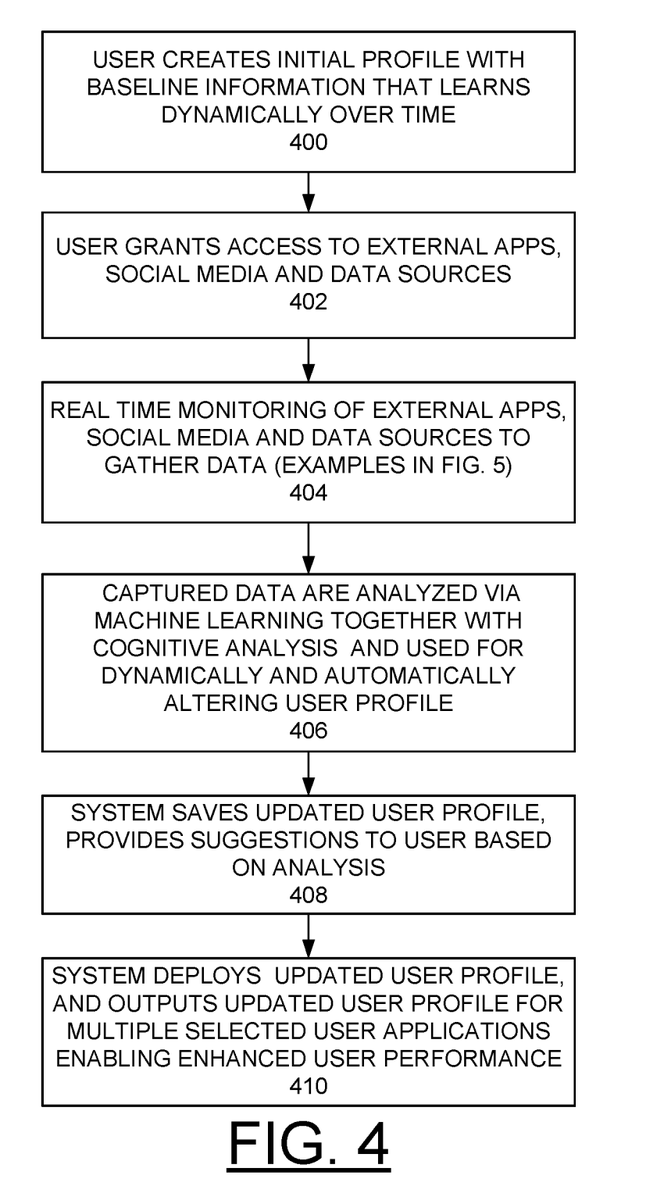
FIG. 4 is a flow chart illustrating example operations for implementing dynamically and automatically altering a user profile based on machine learning and cognitive analysis in accordance with an embodiment of the invention.
Figure 5:
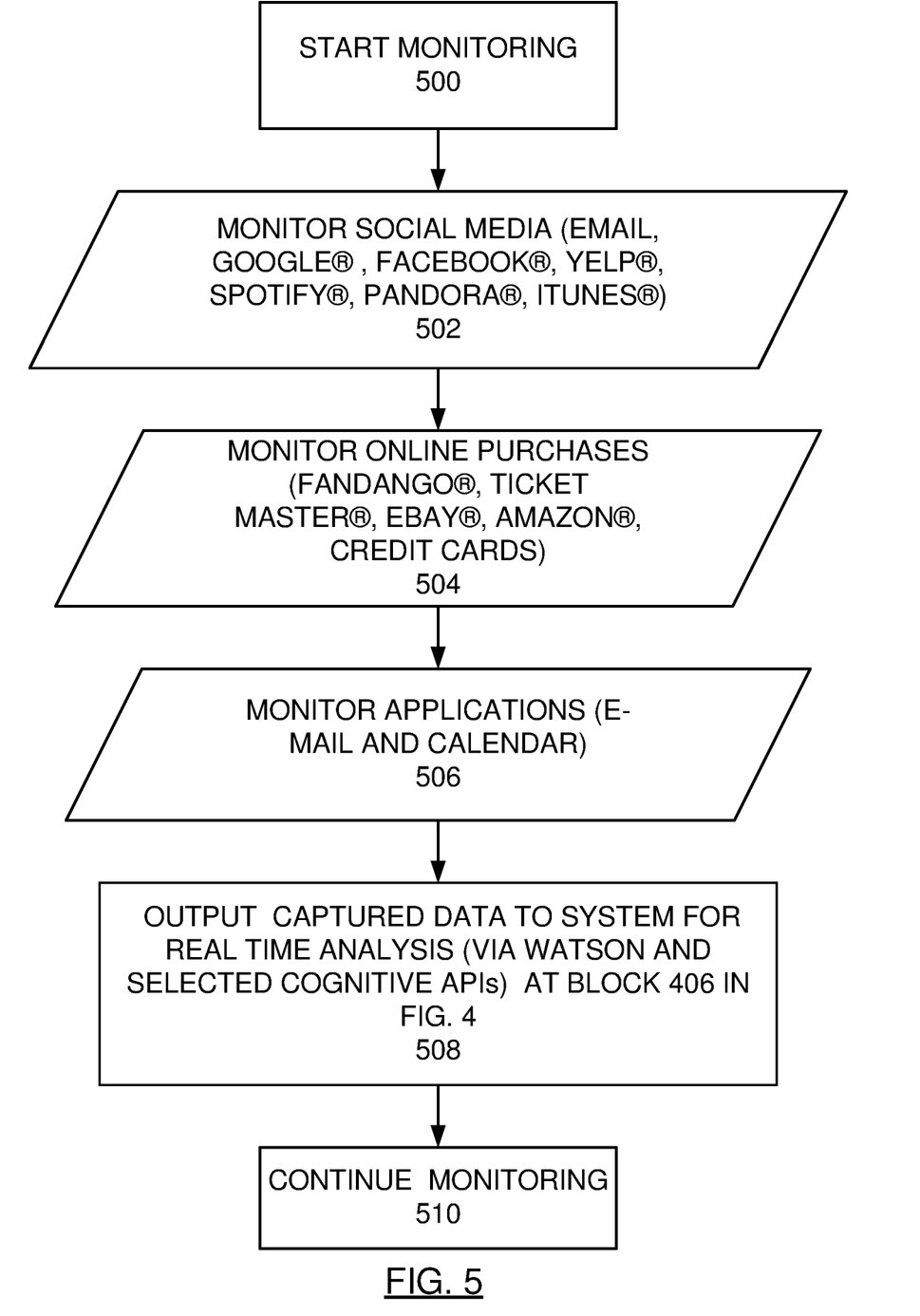
FIG. 5 is a flow chart illustrating further example operations for implementing dynamically and automatically altering of a user profile based on machine learning and cognitive analysis in accordance with an embodiment of the invention.

Referring to FIGS. 4 and 5, there are shown example operations for implementing dynamic and automatic altering of a user profile based on machine learning and cognitive analysis in accordance with preferred embodiments. In FIG. 4, operations start with the user creating an initial profile with baseline information that learns dynamically over time as indicated at a block 400. The user grants access to external applications, social media and data sources as indicated at a block 402. Real time monitoring of external application, social media and data sources is performed to gather data as indicated at a block 404. Examples of real time data monitoring are shown in FIG. 5. As indicated at a decision block 406, performing data analysis using machine learning and cognitive analysis of captured data and the data analysis is used for dynamic and automatic altering of the user profile. For example, data analysis via Watson and other selected cognitive APIs system utilizes machine learning techniques to recognize usage patterns and preferences of the user amidst a variety of forums in order to offer specific content suggestions based on perceived interest. Data analysis via at least one of Watson and other selected cognitive application programming interfaces (APIs) include, for example, analyzing real time data via at least one of Alchemy Language, Concept Insights, Dialog, and Visual Insights. The application or system of the invention saves the updated user profile and provides suggestions to the user based on the analysis as indicated at a block 408. The system requires no additional manual input from the user, but instead monitors and uses the user's normal day to day activities in order to update the user profile. As indicated at a decision block 410, the system deploys the updated user profile and outputs the updated user profile for multiple selected user applications, enabling enhanced user performance.

In FIG. 5, monitoring operations start as indicated at a block 500, including for example, monitoring social media as indicated at a block 502, such as email, GOOGLE®, FACEBOOK®, ACTIVE.COM®, YELP®, SPOTIFY®, PANDORA®, iTUNES® and the like. Monitoring online purchases and purchase history, such as FANDANGO®, TICKET MASTER®, eBAY®, and AMAZON® credit cards, are preformed, as indicated at a block 504. Monitoring applications, such as Email, email and calendar, is preformed, as indicated at a block 506. Output of captured data to the system is provided for real time analysis, via Watson and selected cognitive APIs at block 406 in FIG. 4, as indicated at a block 508. Monitoring from multiple sources continues as indicated at a block 510.

Figure 6:
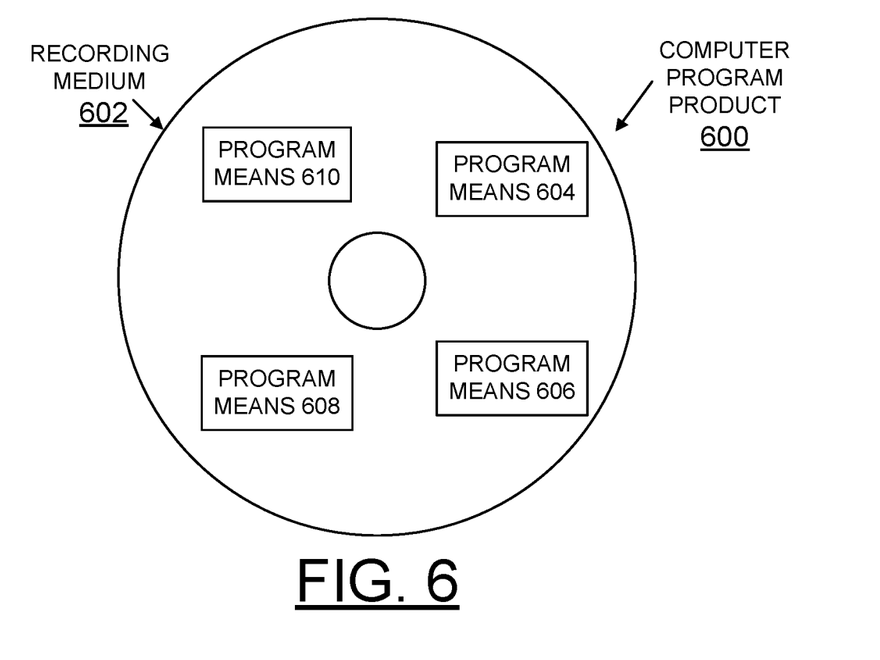
FIG. 6 is a block diagram illustrating a computer program product in accordance with the preferred embodiment.

Referring now to FIG. 6, an article of manufacture or a computer program product 600 of the invention is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. Recording medium 602 stores program means 604, 606, 608, and 610 on the medium 602 for carrying out the methods for implementing dynamic and automatic altering a user profile based on machine learning and cognitive analysis to improve user performance in computer system 100 and cloud system 200 of FIGS. 2 and 3 in accordance with preferred embodiments.

A sequence of program instructions or a logical assembly of one or more interrelated modules defined by the recorded program means 604, 606, 608, and 610, direct the computer system 100 and cloud system 200 for implementing dynamic and automatic altering of a user profile for optimal performance of the preferred embodiments.

While the present invention has been described with reference to the details of the embodiments of the invention shown in the drawings, these details are not intended to limit the scope of the invention as claimed in the appended claims.

What is claimed is:

1. A computer system for implementing dynamic and automatic altering of a user profile for multiple external applications based on machine learning and cognitive analysis comprising:
    a processor;
    a network interface communicatively coupled to the processor;
    a live data monitoring, machine learning, and data cognitive analysis control;
    said processor using said control to perform:
        receiving multiple user granted access permissions to monitor live data from multiple external social media and applications;
        using the user granted access permissions to separately access and retrieve, via the network interface, the live data from the multiple external social media and applications;
        analyzing the retrieved live data using machine learning and cognitive analysis without explicit input from the user to generate an altered user profile by altering the user profile;
        automatically storing said altered user profile for the user; and
        automatically deploying, via the network interface, said altered user profile to the social media and applications.

2. The computer system as recited in claim 1, including control code stored on a computer readable medium, and wherein said processor uses said control code to implement dynamic and automatic altering of the user profile.

3. The computer system as recited in claim 1, wherein said external applications granted access permissions are dynamically monitored without any further manual input from the user.

4. The computer system as recited in claim 1, wherein said processor monitoring live data from multiple external applications includes said processor monitoring system and network user metrics.

5. The computer system as recited in claim 4, wherein said processor monitoring system and network user metrics includes said processor monitoring at least one of social media, online purchase history, and user applications.

6. The computer system as recited in claim 5, wherein the external applications include at least one of user email and user calendar.

7. The computer system as recited in claim 1, wherein analyzing the live data using machine learning and cognitive analysis includes analyzing real time data via cognitive application programming interfaces (APIs).

8. The computer system as recited in claim 1, wherein monitoring live data from the multiple external applications includes predicting user preferences by data analysis via cognitive process from said live data.

9. The computer system as recited in claim 1, wherein monitoring live data from the multiple external applications includes automatically selecting user profile updates based on identifying user interests and preferences.

10. The computer system as recited in claim 1, wherein said processor automatically deploying said stored user profile to the multiple external applications includes the user continuing to perform activities and the user receiving system suggestions based on said deployed user profile.

11. The computer system as recited in claim 1, wherein said processor automatically deploying said stored user profile to the multiple external applications comprises using the user granted access permissions.

\* \* \* \* \*